US012063471B2

(12) United States Patent
Kim et al.

(10) Patent No.: US 12,063,471 B2
(45) Date of Patent: Aug. 13, 2024

(54) ELECTRONIC DEVICE INCLUDING SPEAKER MODULE

(71) Applicant: Samsung Electronics Co., Ltd., Gyeonggi-do (KR)

(72) Inventors: Taehoon Kim, Gyeonggi-do (KR); Jinwan An, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/372,983

(22) Filed: Sep. 26, 2023

(65) Prior Publication Data

US 2024/0073588 A1 Feb. 29, 2024

Related U.S. Application Data

(63) Continuation of application No. 17/501,055, filed on Oct. 14, 2021, now Pat. No. 11,805,357, which is a continuation of application No. PCT/KR2021/014005, filed on Oct. 12, 2021.

(30) Foreign Application Priority Data

Dec. 2, 2020 (KR) ........................ 10-2020-0166850
Jul. 6, 2021 (KR) ........................ 10-2021-0088272

(51) Int. Cl.
*H04R 1/28* (2006.01)

(52) U.S. Cl.
CPC ........ *H04R 1/2811* (2013.01); *H04R 2499/11* (2013.01); *H04R 2499/15* (2013.01)

(58) Field of Classification Search
CPC .............. H04R 1/2811; H04R 2499/11; H04R 2499/15
USPC .......................................................... 381/345
See application file for complete search history.

(56) References Cited

U.S. PATENT DOCUMENTS

2006/0240881 A1 10/2006 Cho et al.
2014/0194165 A1 7/2014 Hwang
2014/0204037 A1 7/2014 Kim
2014/0341418 A1 11/2014 Kwong et al.
2014/0362513 A1 12/2014 Nurmi
2016/0154437 A1 6/2016 Kim et al.
2018/0014417 A1 1/2018 Seo et al.
(Continued)

FOREIGN PATENT DOCUMENTS

KR 10-2016-0112300 A 10/2006
KR 10-2008-0081685 A 9/2008
(Continued)

OTHER PUBLICATIONS

International Search Report dated Jan. 7, 2022.

*Primary Examiner* — Sean H Nguyen
(74) *Attorney, Agent, or Firm* — Cha & Reiter, LLC

(57) ABSTRACT

According to an embodiment of the disclosure, an electronic device may include a housing including a first housing and a second housing receiving at least a portion of the first housing and configured to guide a slide of the first housing, a display including a first display area disposed on the second housing and a second display area extending from the first display area, a speaker module disposed in the housing, a resonance space facing at least a portion of the speaker module and configured to vary in size based on a slide of the first housing with respect to the second housing, and a processor configured to adjust a sound output from the speaker module based on the size of the resonance space.

7 Claims, 14 Drawing Sheets

(56) References Cited

U.S. PATENT DOCUMENTS

| | | | |
|---|---|---|---|
| 2019/0028580 | A1 | 1/2019 | Hosoi et al. |
| 2019/0335258 | A1 | 10/2019 | Vaturi |
| 2020/0329132 | A1 | 10/2020 | Jung et al. |
| 2020/0381007 | A1 | 12/2020 | Hur et al. |

FOREIGN PATENT DOCUMENTS

| | | | |
|---|---|---|---|
| KR | 10-2014-0051720 | A | 5/2014 |
| KR | 10-2014-0095347 | A | 8/2014 |
| KR | 10-2015-0133948 | A | 12/2015 |
| KR | 10-2018-0006533 | A | 1/2018 |
| KR | 10-2019-0088316 | A | 7/2019 |
| KR | 10-2020-0021392 | A | 2/2020 |
| KR | 10-2020-0119003 | A | 10/2020 |
| KR | 10-2022-0130764 | A | 9/2022 |
| WO | 2020/055460 | A1 | 3/2020 |

ELECTRONIC DEVICE INCLUDING SPEAKER MODULE

CROSS-REFERENCE TO RELATED APPLICATIONS

This application is a continuation of application Ser. No. 17/501,055 filed on Oct. 14, 2021, which is a Continuation of International Application No. PCT/KR2021/014005 designating the United States, filed on Oct. 12, 2021, in the Korean Intellectual Property Receiving Office and claiming priority to Korean Patent Application No. 10-2020-0166850, filed on Dec. 2, 2020, in the Korean Intellectual Property Office and Korean Patent Application No. 10-2021-0088272, filed on Jul. 6, 2021, in the Korean Intellectual Property Office, the disclosures of which are incorporated by reference herein in their entireties.

TECHNICAL FIELD

One or more embodiments of the instant disclosure generally relate to an electronic device including a speaker module.

BACKGROUND ART

With the development of information and communication technology and semiconductor technology, various functions are being integrated into portable electronic devices. For example, one such electronic device may implement not only communication functions but also entertainment functions, such as playing games, multimedia functions, such as playing music and videos, communication and security functions for mobile banking, and scheduling and e-wallet functions. Such electronic devices have become compact enough such that users can conveniently carry the devices with them wherever they go.

As these various functions are implemented, larger displays for these electronic devices have become increasingly common and desired. For example, large displays allow for better use of multimedia services as well as other services such as text messaging services. This, however, has associated tradeoffs with, for example, the size of the electronic devices.

An electronic device (e.g., a portable terminal) may include a display having a flat surface or both a flat surface and a curved surface. Such an electronic device including the display may have limitations in realizing a screen larger than the size of the electronic device due to the fixed display structure. Accordingly, research has been conducted on electronic devices that include foldable or rollable displays.

An electronic device including a rollable display may have an open state configuration and a closed state configuration. In the open state configuration, the electronic device may have increased length or volume. For example, an empty space may be formed in the electronic device in the open state.

Conventionally, this empty space has no useful purpose.

SUMMARY

According to certain embodiments of the disclosure, there may be provided an electronic device that uses the empty space formed in an open state thereof as a resonance space of a speaker.

According to certain embodiments of the disclosure, there may be provided an electronic device that adjusts a signal generated from a speaker module based on the size of a resonance space of the electronic device.

According to an embodiment of the disclosure, an electronic device may comprise a housing including a first housing and a second housing receiving at least a portion of the first housing and configured to guide a slide of the first housing, a display including a first display area disposed on the second housing and a second display area extending from the first display area, a speaker module disposed in the housing, and a resonance space facing at least a portion of the speaker module and configured to vary in size based on the slide of the first housing with respect to the second housing, and a processor configured to adjust a sound output from the speaker module based on the size of the resonance space.

According to an embodiment of the disclosure, an electronic device may comprise a housing including a first housing and a second housing receiving at least a portion of the first housing and configured to guide a slide of the first housing, a display including a first display area visually exposed to an outside of the housing and a second display area extending from the first display area and configured to be received in the second housing based on the slide of the first housing with respect to the second housing, a speaker module disposed in the housing, a resonance space facing at least a portion of the speaker module and configured to vary in size based on the slide of the first housing with respect to the second housing, and a sealing member disposed in the housing, forming at least a portion of the resonance space, and configured to be deformed based on the slide of the first housing.

The disclosure is not limited to the foregoing embodiments but various modifications or changes may rather be made thereto without departing from the spirit and scope of the disclosure.

According to certain embodiments of the disclosure, the electronic device may use an empty spaced formed when the housing is slid out as a resonance space, thereby enhancing the performance of the speaker.

According to certain embodiments of the disclosure, the electronic device may adjust the sound generated from the speaker module based on the size of the resonance space, thereby enhancing sound quality.

DESCRIPTION OF THE DRAWINGS

FIG. 7 is a view illustrating an internal structure of an electronic device in a closed state according to an embodiment of the disclosure;

DETAILED DESCRIPTION

Figure 1:
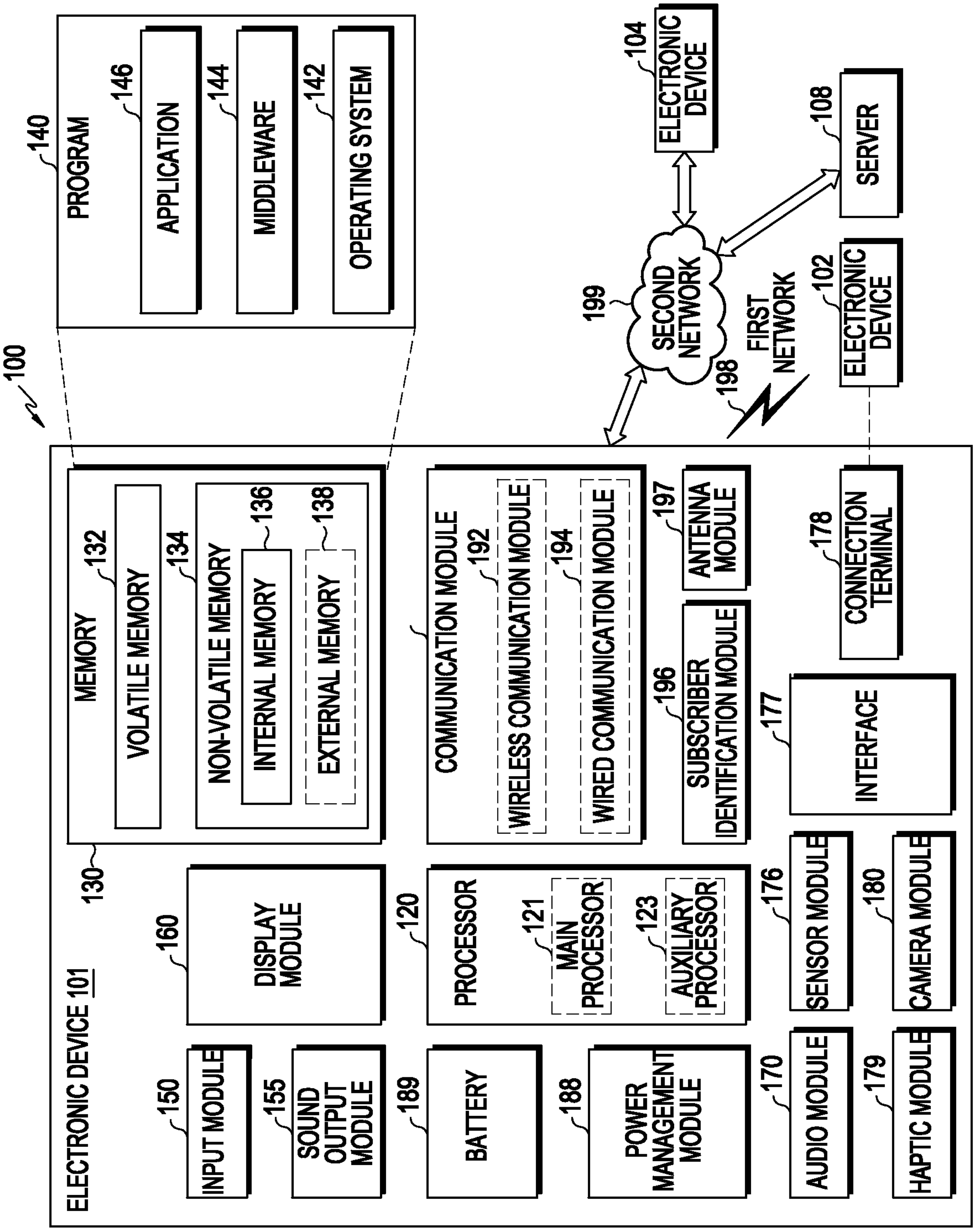
FIG. 1 is a block diagram illustrating an electronic device in a network environment according to various embodiments of the disclosure.

FIG. 1 is a block diagram illustrating an electronic device in a network environment according to various embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
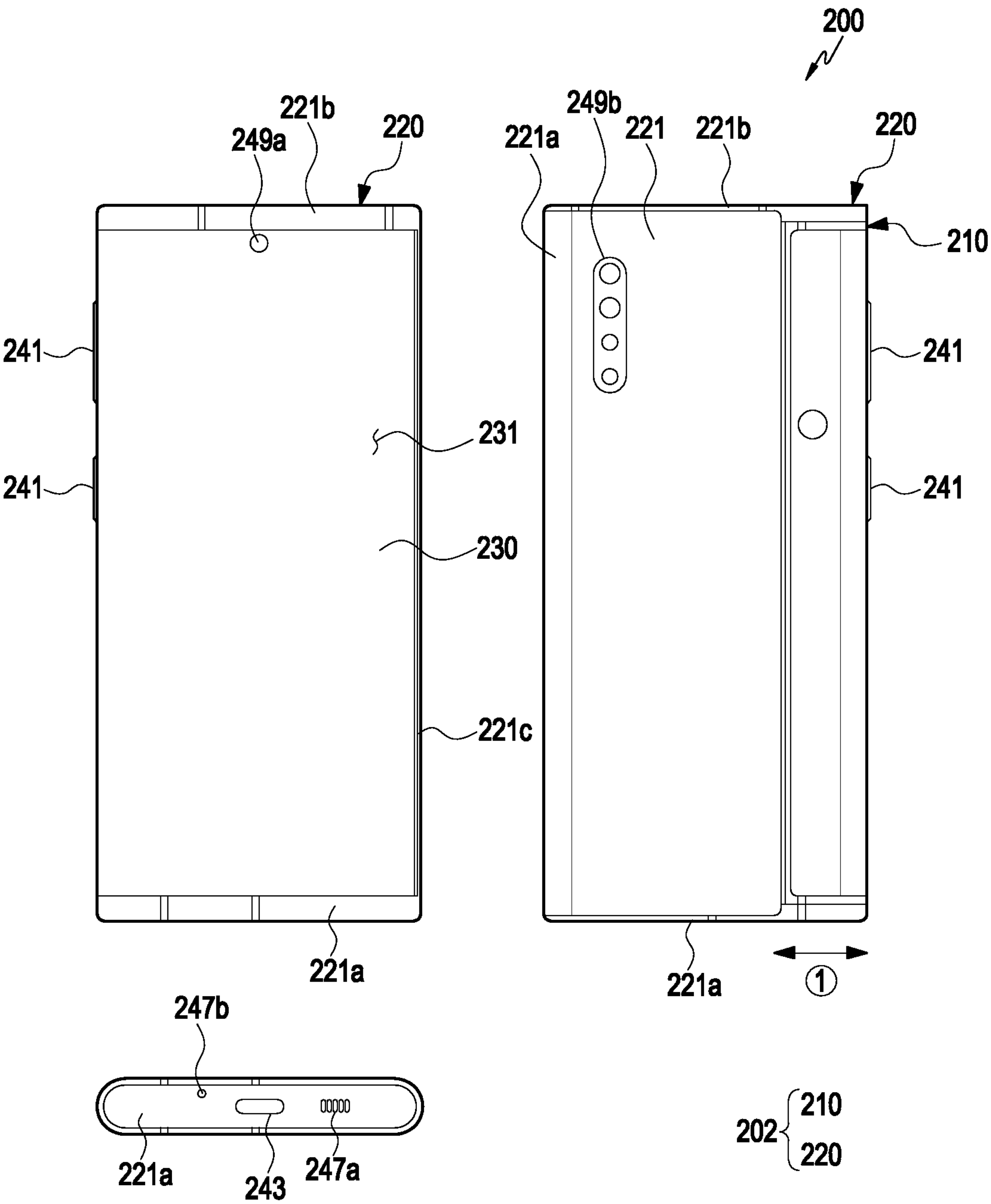
FIG. 2 is a view illustrating an electronic device in a closed state, according to an embodiment of the disclosure.
Figure 3:
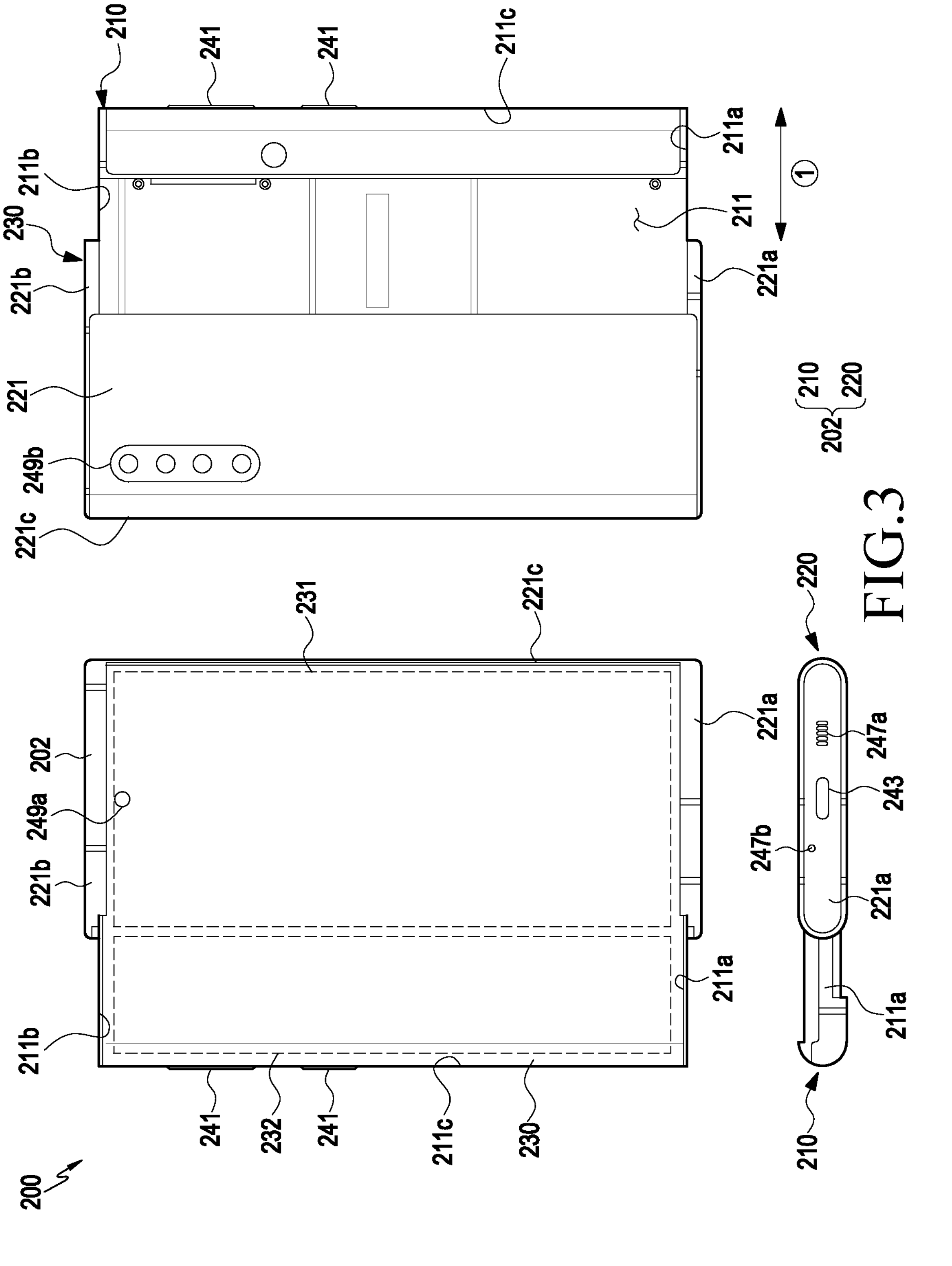
FIG. 3 is a view illustrating an electronic device in an open state, according to an embodiment of the disclosure.

FIG. 2 is a view illustrating an electronic device in a closed state, according to an embodiment of the disclosure. FIG. 3 is a view illustrating an electronic device in an open state, according to an embodiment of the disclosure. For example, FIG. 2 is a view illustrating a state in which a second display area 232 is received in a housing 202. FIG. 3 is a view illustrating a state in which at least a portion of the second display area 232 is exposed to the outside of the housing 202.

Referring to FIGS. 2 and 3, the electronic device 200 may include a housing 202. The housing 202 may include a second housing 220 and a first housing 210 that is movable with respect to the second housing 220. According to an embodiment, the electronic device 200 may have a structure in which the second housing 220 is slidably disposed on the first housing 210. According to an embodiment, the first housing 210 may be disposed to perform reciprocating motion by a predetermined distance in a predetermined direction with respect to the second housing 220, for example, a direction indicated by an arrow ①. The configuration of the electronic device 200 of FIGS. 2 and 3 may be identical in whole or part to the configuration of the electronic device 101 of FIG. 1.

According to an embodiment, the first housing 210 may be referred to as, e.g., a first structure, a slide part, or a slide housing, and may be disposed to move in a reciprocating manner with respect to the second housing 220. According to an embodiment, the second housing 220 may be referred to as, e.g., a second structure, a main part, or a main housing. The second housing 220 may receive at least a portion of the first housing 210 and may guide the sliding of the first housing 210. According to an embodiment, the second housing 220 may house various electrical and electronic components, such as a main circuit board or a battery. According to an embodiment, a portion (e.g., the first display area 231) of the display 230 may be visually exposed to the outside of the housing 202. According to an embodiment, another portion (e.g., the second display area 232) of the display 230 may be received (e.g., slide-in) by the inside of the second housing 220 or visually exposed (e.g., slide-out) to the outside of the second housing 220 as the first housing 210 moves (e.g., slides) relative to the second housing 220.

Figure 4:
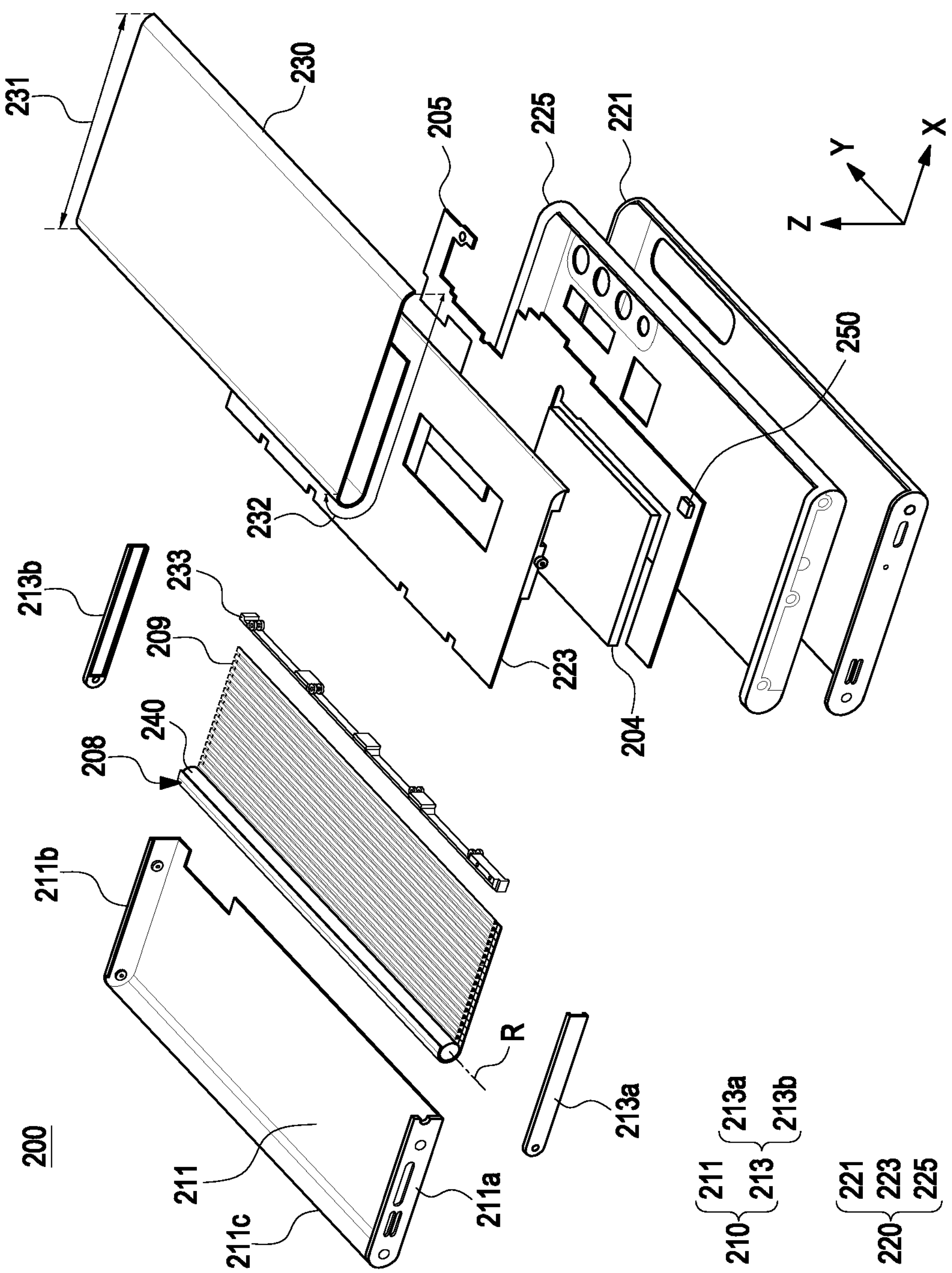
FIG. 4 is an exploded perspective view illustrating an electronic device according to an embodiment of the disclosure.

According to an embodiment, the first housing 210 may include first sidewalls 211*a*, 211*b*, and 211*c* for surrounding at least a portion of the display 230 and/or the multi-bar structure (e.g., the multi-bar structure 208 of FIG. 4). According to an embodiment, the first sidewalls 211*a*, 211*b*, and 211*c* may extend from the first supporting member 211. The first sidewalls 211*a*, 211*b*, and 211*c* may include a 1-1th sidewall 211*a*, a 1-2th sidewall 211*b* opposite to the 1-1th sidewall 211*a*, and a 1-3th sidewall 211*c* extending from the 1-1th sidewall 211*a* to the 1-2th sidewall 211*b*. According to an embodiment, the 1-3th sidewall 211*c* may be substantially perpendicular to the 1-1th sidewall 211*a* and/or the 1-2th sidewall 211*b*. According to an embodiment, in the closed state (e.g., FIG. 2) of the electronic device 200, the 1-1th sidewall 211*a* may face the 2-1th sidewall 221*a* of the second housing 220, and the 1-2th sidewall 211*b* may face the 2-2th sidewall 221*b* of the second housing 220. According to an embodiment, the first supporting member 211, the 1-1th sidewall 211*a*, the 1-2th sidewall 211*b*, and/or the 1-3th sidewall 211*c* may be integrally formed. According to another embodiment, the first supporting member 211, the 1-1th sidewall 211*a*, the 1-2th sidewall 211*b*, and/or the 1-3th sidewall 211*c* may be formed as separate components and later be combined or assembled.

According to an embodiment, the second housing 220 may include second sidewalls 221*a*, 221*b*, and 221*c* to surround at least a portion of the first housing 210. According to an embodiment, the second sidewalls 221*a*, 221*b*, and 221*c* may extend from the rear plate 221. According to an embodiment, the second sidewalls 221*a*, 221*b*, and 221*c* may include a 2-1th sidewall 221*a*, a 2-2th sidewall 221*b* opposite to the 2-1th sidewall 221*a*, and a 2-3th sidewall 221*c* extending from the 2-1th sidewall 221*a* to the 2-2th sidewall 221*b*. According to an embodiment, the 2-3th sidewall 221*c* may be substantially perpendicular to the 2-1th sidewall 221*a* and/or the 2-2th sidewall 221*b*. According to an embodiment, the 2-1th sidewall 221*a* may face the 1-1th sidewall 211*a*, and the 2-2th sidewall 221*b* may face the 1-2th sidewall 211*b*. For example, in the closed state (e.g., FIG. 2) of the electronic device 200, the 2-1th sidewall 221*a* may cover at least a portion of the 1-1th sidewall 211*a*, and the 2-2th sidewall 221*b* may cover at least a portion of the 1-2th sidewall 211*b*.

According to an embodiment, the 2-1th sidewall 221*a*, the 2-2nd sidewall 221*b*, and the 2-3th sidewall 221*c* may be formed to have an opening in one surface (e.g., the front surface) to receive at least a portion of the first housing 210. For example, the first housing 210 may be connected to the second housing 220 while being at least partially covered, and the first housing 210 may slide in the direction of arrow ① while being guided by the second housing 220. According to an embodiment, the rear plate 221, the 2-1th sidewall 221*a*, the 2-2th sidewall 221*b*, and/or the 2-3th sidewall 221*c* may be integrally formed. According to another embodiment, the rear plate 221, the 2-1th sidewall 221*a*, the 2-2th sidewall 221*b*, and/or the 2-3th sidewall 221*c* may be formed as separate components and be later combined or assembled.

According to an embodiment, the rear plate 221 and/or the 2-3th sidewall 221*c* may cover at least a portion of the display 230. For example, at least a portion of the display 230 may be received in the second housing 220. The rear plate 221 and/or the 2-3th sidewall 221*c* may cover a portion of the flexible display 230 received in the second housing 220.

According to an embodiment, the electronic device 200 may include a display 230. For example, the display 230 may include a flexible display or a rollable display. According to an embodiment, at least a portion of the display 230 may slide based on a slide of the first housing 210. According to an embodiment, the display 230 may include, or be disposed adjacent to, a touch detection circuit, a pressure sensor capable of measuring the intensity (pressure) of a touch, and/or a digitizer that detects a magnetic field-type stylus pen. The configuration of the display 230 of FIGS. 2 and 3 may be identical in whole or part to the configuration of the display module 160 of FIG. 1.

According to an embodiment, the display 230 may include a first display area 231 and a second display area 232. According to an embodiment, at least a portion of the first display area 231 may be disposed on the second housing 220. For example, the first display area 231 may be an area that is always visible from the outside, regardless of whether the electronic device is in the open state or closed state. According to an embodiment, the first display area 231 may refer to an area that cannot be positioned inside the housing 202. According to an embodiment, the second display area 232 may extend from the first display area 231, and the second display area 232 may be inserted or received in, or exposed to the outside of, the second housing 220 depending on how the first housing 210 is slid relative to the second housing 220. According to another embodiment (not shown), the first display area 231 may be disposed on the first housing 210, and the second display area 232 may extend from the first display area 231.

According to an embodiment, the second display area 232 may be substantially moved while being guided by the multi-bar structure (e.g., the multi-bar structure 208 of FIG. 4) mounted in the first housing 210 and may be thus received in, or exposed to the outside of, the second housing 220 or a space formed between the first housing 210 and the second housing 220. According to an embodiment, the second display area 232 may move based on the slide of the first housing 210 in the first direction (e.g., the direction indicated by the arrow ①). For example, at least a portion of the second display area 232 may be unfolded or rolled together with the multi-bar structure 208 based on the slide of the first housing 210.

According to an embodiment, when viewed from above, if the first housing 210 moves from the closed state to the open state, the second display area 232 may be gradually exposed to the outside of the housing 202 to be substantially coplanar with the first display area 231. In an embodiment, the second display area 232 may be at least partially received in the first housing 210 and/or the second housing 220.

According to an embodiment, the electronic device 200 may include at least one key input device 241, a connector hole 243, audio modules 247*a* and 247*b*, or camera modules 249*a* and 249*b*. Although not shown, the electronic device 200 may further include an indicator (e.g., a light emitting diode (LED) device) or various sensor modules. The configuration of the audio module 247*a* and 247*b* and camera modules 249*a* and 249*b* of FIGS. 2 and 3 may be identical in whole or part to the configuration of the audio module 170 and the camera module 180 of FIG. 1.

According to an embodiment, the key input device 241 may be positioned in one area of the first housing 210. Depending on the appearance and the state of use, the electronic device 200 may be designed to omit the illustrated key input device 241 or to include additional key input device(s). According to an embodiment, the electronic device 200 may include a key input device (not shown), e.g., a home key button or a touchpad disposed around the home key button. According to another embodiment (not shown), at least a portion of the key input device 241 may be disposed on the second housing 220.

According to an embodiment, the connector hole 243 may be omitted, but if not omitted, it may receive a connector (e.g., a universal serial bus (USB) connector) for transmitting and receiving power and/or data with an external electronic device. Although not shown, the electronic device 200 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 221*c*, but the present disclosure is not limited thereto. The connector hole 243 or a connector hole not shown may be disposed in the 2-1th sidewall 221*a* or the 2-2th sidewall 221*b*.

According to an embodiment, the audio modules 247*a* and 247*b* may include at least one speaker hole 247*a* or at least one microphone hole 247*b*. One of the speaker holes 247*a* may be provided as an external speaker hole, and the other (not shown) may be provided as a receiver hole for voice calls. The electronic device 200 may include a microphone for obtaining sound. The microphone may obtain external sound of the electronic device 200 through the microphone hole 247*b*. According to an embodiment, the electronic device 200 may include a plurality of microphones to detect the direction of sound. According to an embodiment, the electronic device 200 may include an audio module in which the speaker hole 247*a* and the microphone hole 247*b* are implemented as one hole or may include a speaker without the speaker hole 247*a* (e.g., a piezo speaker).

According to an embodiment, the camera modules 249*a* and 249*b* may include a first camera module 249*a* and/or a second camera module 249*b*. The second camera module 249*b* may be positioned in the second housing 220 and may capture a subject in a direction opposite to the first display area 231 of the display 230. The electronic device 200 may include a plurality of camera modules 249*a* and 249*b*. For example, the electronic device 200 may include at least one of a wide-angle camera, a telephoto camera, or a close-up camera. According to an embodiment, the electronic device 200 may measure the distance to the subject by including an infrared projector and/or an infrared receiver. The camera modules 249*a* and 249*b* may include one or more lenses, an image sensor, and/or an image signal processor. The electronic device 200 may further include another camera module (first camera module 249*a*, e.g., a front camera) that captures a subject in a direction opposite to the second camera module 249*b*. For example, the first camera module 249*a* may be disposed around the first display area A1 or in an area overlapping the first display area 231. If disposed in an area overlapping the display 230, the first camera module 249*a* may capture the subject through the display 230.

According to an embodiment, an indicator (not shown) of the electronic device 200 may be disposed on the first housing 210 and/or the second housing 220, and the indicator may include a light emitting diode to provide state information about the electronic device 200 as a visual signal. The sensor module (e.g., the sensor module 176 of FIG. 1) of the electronic device 200 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). In another embodiment, the electronic device 200 may include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

FIG. 4 is an exploded perspective view illustrating an electronic device according to an embodiment of the disclosure.

Referring to FIG. 4, an electronic device 200 may include a first housing 210, a second housing 220, a display 230, and a multi-bar structure 208. A portion (e.g., the second display area 232) of the display 230 may be received in the electronic device 200 while being guided by the multi-bar structure 208. The configuration of the first housing 210, the second housing 220, and the display 230 of FIG. 4 may be identical in whole or part to the configuration of the first housing 210, the second housing 220, and the display 230 of FIGS. 2 and/or 3.

According to an embodiment, the first housing 210 may include a first supporting member 211 (e.g., a slide plate). According to an embodiment, the first supporting member 211 may be slidably connected to the second housing 220. According to an embodiment, the first supporting member 211 may include a metallic material and/or a non-metal material (e.g., polymer).

According to an embodiment, the first housing 210 may include at least one guide rail 213. According to an embodiment, the guide rail 213 may guide the movement of the multi-bar structure 208. For example, the guide rail 213 may include a groove or recess for receiving at least a portion of the multi-bar structure 208. The multi-bar structure 208 may slide with respect to the second housing 220 as the multi-bar structure 208 is at least partially received in the guide rail 213. According to an embodiment, the guide rail 213 may be disposed on the first supporting member 211 and/or the first sidewall 211*a* or 211*b*. For example, guide rails 213 may include a first guide rail 213*a* disposed on the 1-1th sidewall 211*a* and a second guide rail 213*b* disposed on the 1-2th sidewall 211*b*. According to an embodiment, at least a portion of the first guide rail 213*a* may be positioned between the 1-1th sidewall 211*a* and the articulated hinge structure 208, and at least a portion of the second guide rail 213*b* may be positioned between the 1-2th sidewall 211*b* and the articulated hinge structure 208. The articulated hinge structure 208 is movable corresponding to a roller 240.

According to an embodiment, the multi-bar structure 208 may be connected with the first housing 210. For example, the multi-bar structure 208 may be connected with the first supporting member 211. The multi-bar structure 208 may move with respect to the second housing 220 as the first housing 210 slides. The multi-bar structure 208 may be substantially received in the second housing 220 in the closed state (e.g., FIG. 2).

According to an embodiment, the multi-bar structure 208 may include a plurality of bars or rods 209. The plurality of rods 209 may be disposed substantially parallel to the axis of rotation R of the roller 240 and may be arranged along a direction perpendicular to the rotation axis R (e.g., the direction in which the first housing 210 slides).

According to an embodiment, each rod 209 may pivot around an adjacent rod 209 while remaining parallel with the other adjacent rod 209. According to an embodiment, as the first housing 210 slides, the plurality of rods 209 may be arranged to form a curved shape or may be arranged to form a planar shape. For example, as the first housing 210 slides, a portion of the multi-bar structure 208 facing the 1-3th sidewall 211*c* may form a curved surface, and another portion of the multi-bar structure 208, which does not face the 1-3th sidewall 211*c*, may form a flat surface. According to an embodiment, the second display area 232 of the display 230 may be mounted or supported on the multi-bar structure 208. In a state in which the second display area 232 is exposed to the outside of the second housing 220, at least a portion of the multi-bar structure 208 may form a substantially flat surface, supporting or maintaining the second display area 232 in a flat state. According to an embodiment, the multi-bar structure 208 may be replaced with a bendable integral supporting member (not shown). According to an embodiment, the multi-bar structure 208 may be referred to as an articulated hinge structure.

According to an embodiment, the second housing 220 may include a rear plate 221, a display supporting member 223, and/or a second supporting member 225. According to an embodiment, the rear plate 221 may form at least a portion of the exterior of the second housing 220 or the electronic device 200. For example, the rear plate 221 may provide decorative features on the exterior of the electronic device 200. According to an embodiment, the display supporting member 223 may support at least a portion of the display 230. For example, the first display area 231 may be disposed on the display supporting member 223. According to an embodiment, the second supporting member 225 may support components of the electronic device 200 (e.g., the battery 204 and/or the printed circuit board 205). For example, the battery 204 and the printed circuit board 205 may be disposed between the display supporting member 223 and the second supporting member 225. According to an embodiment, in the closed state of the electronic device 200, at least a portion of the first housing 210 may be disposed between the display supporting member 223 and the second supporting member 225. According to an embodiment, the second housing 220 (e.g., the rear plate 221, the display supporting member 223, and/or the second supporting member 225) may be made of various materials such as metal, glass, synthetic resin, or ceramic. According to an embodiment, the rear plate 221 and the second supporting member 225 may be integrally formed. According to an embodiment, the printed circuit board 205 may receive at least one (e.g., the speaker module 250) of the components of the electronic device 200. According to an embodiment, the battery 204 may supply power to at least one (e.g., the speaker module 250) of the components of the electronic device 200.

According to an embodiment, the electronic device 200 may include a display supporting bar 233. According to an embodiment, the display supporting bar 233 may support at least a portion of the display 230. For example, at least a portion of the display 230 and/or at least a portion of the multi-bar structure 208 may be disposed between the first supporting member 211 of the first housing 210 and the display supporting bar 233. According to an embodiment, the display supporting bar 233 may be connected to the first housing 210. For example, the display supporting bar 233 may be disposed on the first supporting member 211, and at least a portion thereof may be disposed substantially parallel to the 1-3th sidewall 211*c*. According to an embodiment, the display supporting bar 233 may be referred to as a portion of the first housing 210.

According to an embodiment, the roller 240 may be disposed in the first housing 210. For example, the roller 240 may be rotatably mounted to the first supporting member 211 of the first housing 210. According to an embodiment, the roller 240 may guide the rotation of the second display area 232 while rotating around the rotation axis R.

According to an embodiment, the electronic device 200 may include a speaker module 250. According to an embodiment, the speaker module 250 may be mounted on the printed circuit board 205 positioned in the second housing 220. According to another embodiment (not shown), the speaker module 250 may be positioned in the first housing 210. The configuration of the speaker module 250 may be identical in whole or part to the configuration of the audio module 170 of FIG. 1.

According to an embodiment, the first housing 210 may slide based on a command from a processor (e.g., the processor 120 of FIG. 1). According to an embodiment, the electronic device 200 may include a motor (not shown) for providing a driving force to slide the first housing 210 with respect to the second housing 220 and a gear structure (e.g., a rack gear and/or pinion) (not shown) connected to the motor. The processor 120 may change the distance between the first housing 210 and the second housing 220 using the motor. According to an embodiment, the electronic device 200 may include a shape memory alloy (not shown) for providing the driving force to slide the first housing 210 with respect to the second housing 220 and a power supply module (not shown) for providing a current to the shape memory alloy. The processor 120 may change the distance between the first housing 210 and the second housing 220 by changing the shape of the shape memory alloy using the power supply module. According to another embodiment, the first housing 210 may be manually moved with respect to the second housing 220 using a force provided by the user.

According to an embodiment, the electronic device 200 may be passively opened or closed based on an external force (e.g., the user's force). According to an embodiment, the processor (e.g., the processor 120 of FIG. 1) may automatically or semi-automatically open or close the electronic device 200 using a motor (not shown) and/or a shape memory alloy (not shown). For example, the processor 120 may open the electronic device 200 when a designated program (e.g. a video playback application) is used.

Figure 5:
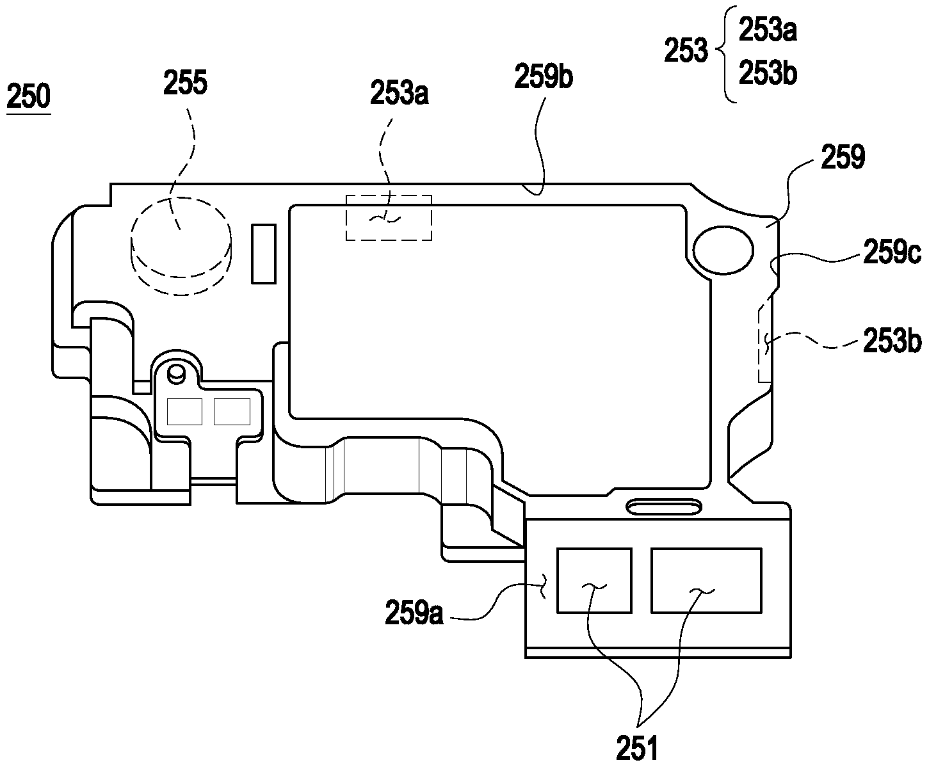
FIG. 5 is a perspective view illustrating a speaker module according to an embodiment of the disclosure.
Figure 6A:
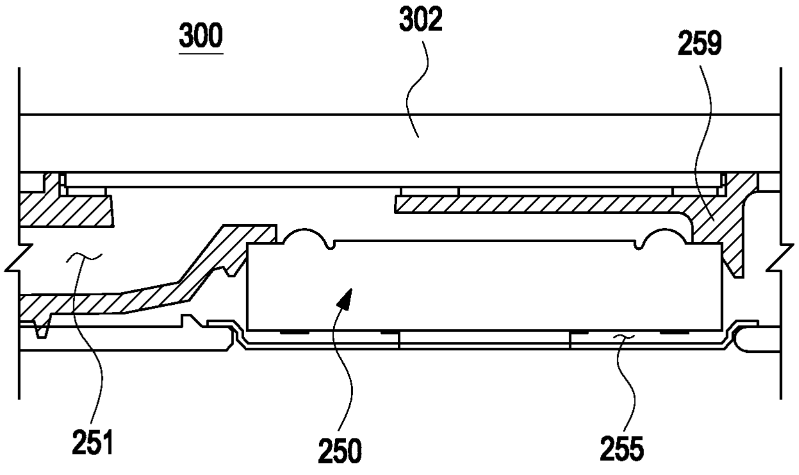
FIG. 6A is a cross-sectional view illustrating an electronic device in a closed state according to an embodiment of the disclosure.
Figure 6B:
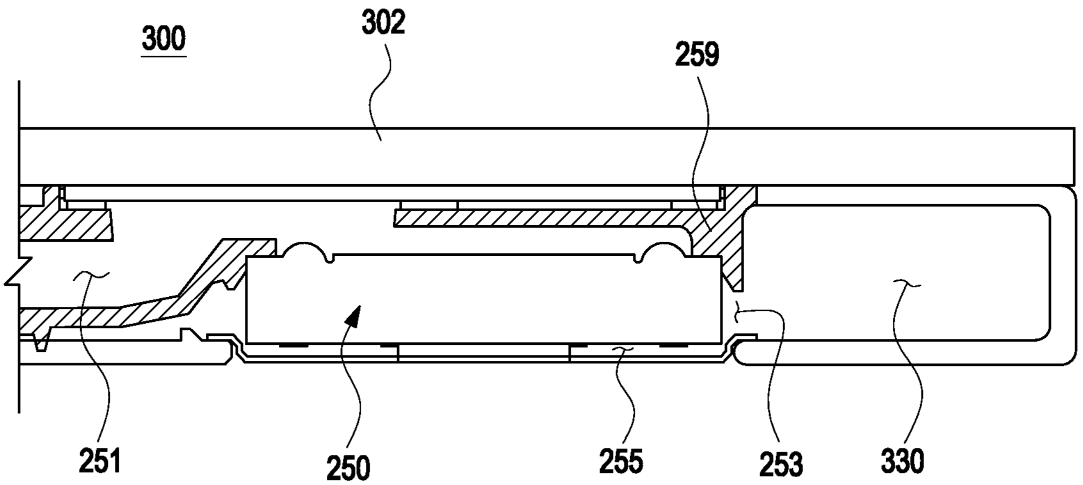
FIG. 6B is a cross-sectional view illustrating an electronic device in an open state according to an embodiment of the disclosure.

FIG. 5 is a perspective view illustrating a speaker module according to an embodiment of the disclosure. FIG. 6A is a cross-sectional view illustrating an electronic device in a closed state according to an embodiment of the disclosure. FIG. 6B is a cross-sectional view illustrating an electronic device in an open state according to an embodiment of the disclosure.

Referring to FIGS. 5, 6A, and 6B, the electronic device 300 may include a speaker module 250 and a housing 302. The configuration of the electronic device 300, the housing 302, and the speaker module 250 of FIGS. 5, 6A, and 6B may be identical in whole or part to the configuration of the electronic device 200, the housings 210 and 220, and the speaker module 250 of FIG. 4.

According to an embodiment, the speaker module 250 may convert an electrical signal into sound. For example, the speaker module 250 may include at least one of a coil (e.g., a voice coil) (not shown) configured to vibrate a diaphragm based on pulse width modulation (PWM), a diaphragm (not shown) configured to vibrate, a damping member (e.g., a spring) (not shown) made of a conductive material to transfer a signal (e.g., power) transmitted from the exterior of the speaker module 250 to the coil, a magnet (not shown), and/or a conductive plate (not shown) for concentrating the magnetic field generated from the magnet.

According to an embodiment, the speaker module 250 may include a speaker enclosure 259 that may form at least a portion of an outer surface of the speaker module 250. According to an embodiment, the speaker enclosure 259 may include at least one of a protective cover for protecting the diaphragm, a frame for receiving one or more components (e.g., the coil, diaphragm, or damping member) of the speaker module 250, and/or a yoke for protecting one or more components (e.g., the magnet) of the speaker module 250. For example, the speaker enclosure 259 may be referred to as a housing or a casing of the speaker module 250. According to an embodiment, at least a portion of the speaker enclosure 259 may be used as a resonator for at least a portion of the sound generated by the speaker module 250. According to an embodiment, the speaker enclosure 259 may be coupled to the housing 302. For example, the speaker module 250 may be disposed in a first housing (e.g., the first housing 210 and/or the second housing 220 of FIG. 3).

According to an embodiment, the speaker module 250 may include at least one radiation hole 251. The radiation hole 251 may form a path for transferring the vibration generated from the diaphragm of the speaker module 250 to the outside of the speaker module 250 or the electronic device (e.g., the electronic device 200 of FIG. 2). For example, the sound emitted from the radiation hole 251 may pass through the speaker hole (e.g., the speaker hole 247*a* of FIG. 2) to the outside of the electronic device 200. According to an embodiment, the radiation hole 251 may be a hole formed in the speaker enclosure 259 to face at least a portion of the diaphragm (not shown). According to an embodiment, the radiation hole 251 may be referred to as a duct structure.

According to an embodiment, the speaker module 250 may include at least one resonance hole 253. According to an embodiment, the resonance hole 253 may face at least a portion of a resonance space (e.g., the resonance space 330 of FIG. 6B). For example, in the open state (e.g., FIG. 3) of the electronic device (e.g., the electronic device 200 of FIG. 3), the sound or vibration generated by the speaker module 250 may pass through the resonance hole 253 to the resonance space 330. According to an embodiment, the resonance hole 253 may be positioned in a direction different from the radiation hole 251 with respect to the center (e.g., the diaphragm) of the speaker module 250. For example, the radiation hole 251 may be formed in the first enclosure surface 259*a* of the speaker module 250. The resonance hole 253 may include at least one of a first resonance hole 253*a* formed in the second enclosure surface 259*b* of the speaker module 250 opposite to the first enclosure surface 259*a* or a second resonance hole 253*b* formed in the third enclosure surface 259*c* extending from the first enclosure surface 259*a* to the second enclosure surface 259*b*. According to an embodiment, the resonance hole 253 may be omitted.

According to an embodiment, the speaker module 250 may include an internal resonance space 255 formed inside the speaker enclosure 259. According to an embodiment, the sound generated by the speaker module 250 may resonate in the internal resonance space 255. According to an embodiment, in an open state (e.g., FIG. 6B) of the electronic device, the sound generated by the speaker module 250 may resonate in the internal resonance space 255 and the resonance space (e.g., the resonance space 330 of FIG. 6B) and, in a closed state (e.g., FIG. 6A) of the electronic device, the sound generated by the speaker module 250 may resonate in the internal resonance space 255 only. According to an embodiment, the low-pitched band (e.g., a 200 Hz to 800 Hz band) of the speaker module 250 may be enhanced based on the size (e.g., volume) of the resonance space (e.g., the internal resonance space 255 and/or the resonance space 330). For example, the magnitude of the sound in the low-pitched band in the open state (e.g., FIG. 6B) of the electronic device 300 may be greater than the magnitude of the sound in the low-frequency band in the closed state (e.g., FIG. 6A) of the electronic device 300.

Figure 7:
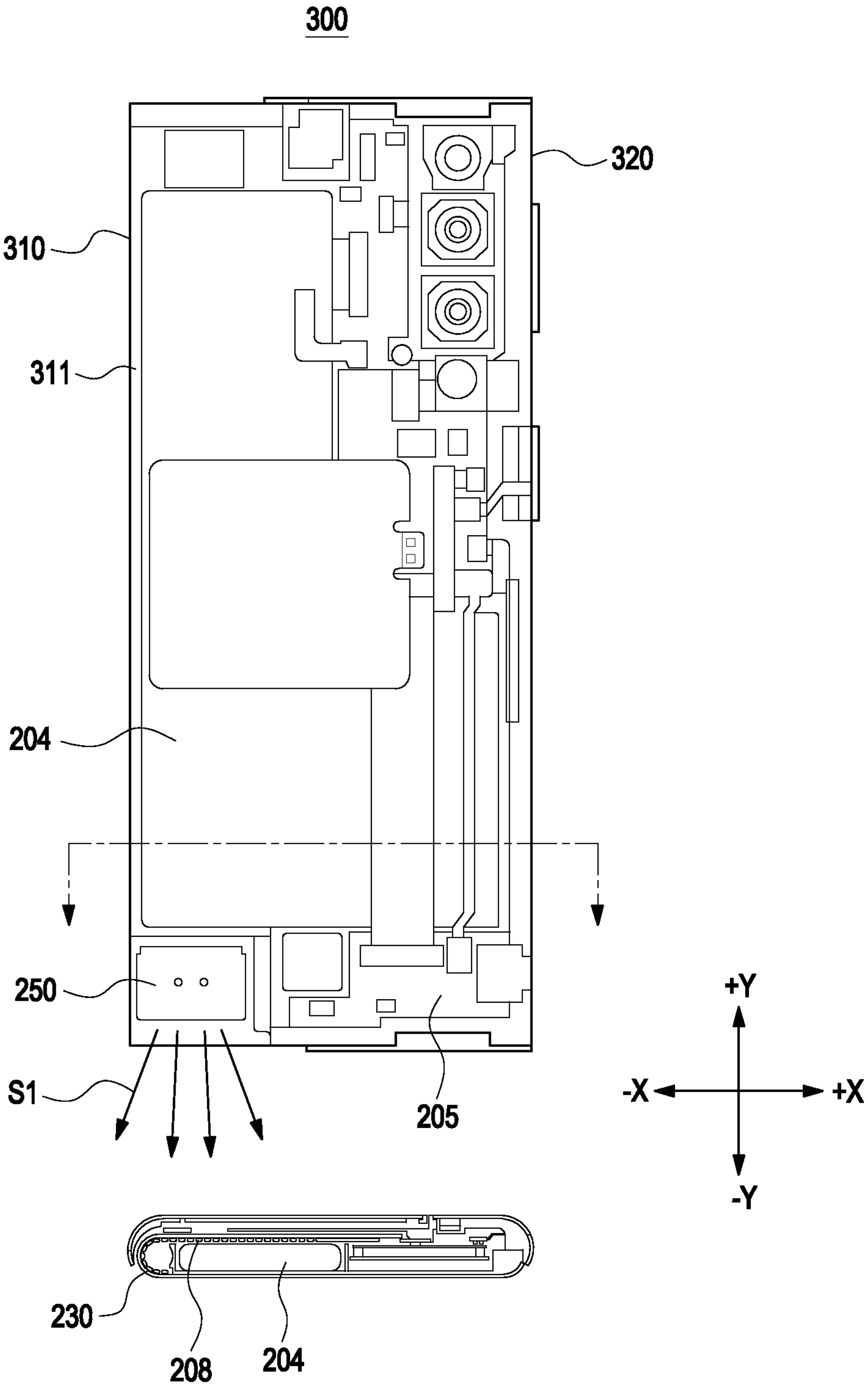
FIG. 7 is a cross-sectional view illustrating an electronic device in an open state according to an embodiment of the disclosure.
Figure 8:
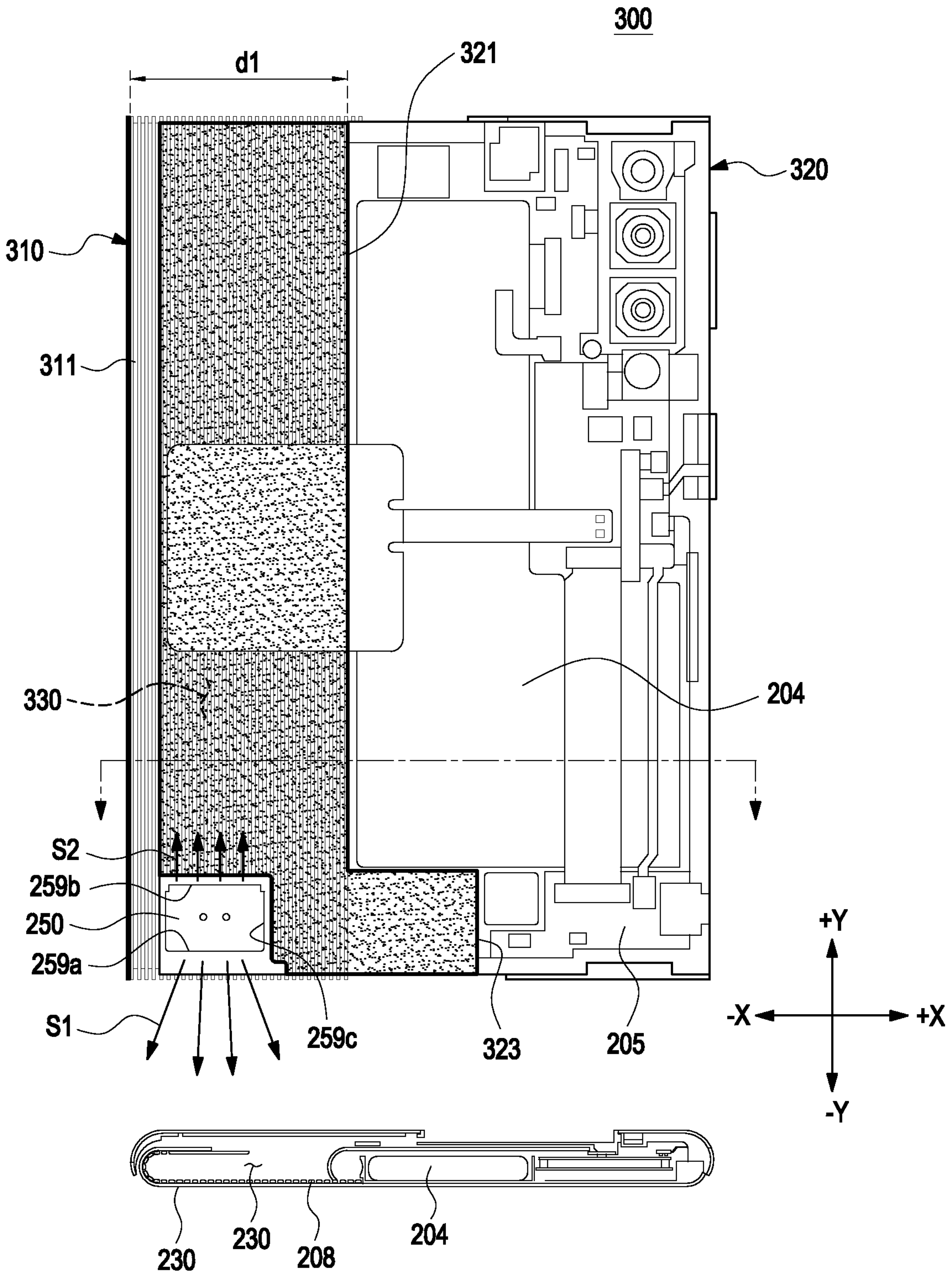
FIG. 8 is a view illustrating an internal structure of an electronic device in an open state according to an embodiment of the disclosure.

FIG. 7 is a view illustrating an internal structure of an electronic device in a closed state according to an embodiment of the disclosure. FIG. 8 is a view illustrating an internal structure of an electronic device in an open state according to an embodiment of the disclosure.

Referring to FIGS. 7 and 8, an electronic device 300 may include a first housing 310, a second housing 320, and a speaker module 250 disposed in the housings 310 and 320. The configuration of the electronic device 300, the first housing 310, the second housing 320, the battery 204, the printed circuit board 205, the multi-bar structure 208, and the speaker module 250 of FIGS. 7 and 8 may be identical in whole or part to the configuration of the electronic device 200, the first housing 210, the second housing 220, the battery 204, the printed circuit board 205, the multi-bar structure 208, and the speaker module 250 of FIG. 4.

According to an embodiment, the first housing 310 may slide with respect to the second housing 320. For example, as the first housing 310 slides in the third direction (+X direction) or the fourth direction (−X direction) with respect to the second housing 320, a resonance space 330 may be formed inside the electronic device 300. According to an embodiment, the resonance space 330 may refer to an empty space surrounded by a component (e.g., the first supporting member 211 of FIG. 4) of the first housing 310, a component (e.g., the second supporting member 225 and/or rear plate 221 of FIG. 4) of the second housing 320, the speaker module 250 (e.g., the speaker enclosure 259 of FIG. 5), and/or a component for sealing the space between the first housing 310 and the second housing 320 (e.g., the first sealing member 340 of FIG. 10 or the second sealing member 350 of FIG. 11A, 11B, and/or 11C). According to an embodiment, the resonance space 330, as an empty space facing the speaker module 250, may be a space that is at least partially sealed.

According to an embodiment, the size of the resonance space 330 may be changed based on the slide of the first housing 310. For example, the first housing 310 may include a first sidewall structure 311. The second housing 320 may include a second sidewall structure 321 substantially parallel to the first sidewall structure 311. The first distance d1 between the first sidewall structure 311 and the second sidewall structure 321 may be changed based on the slide of the first housing 310. According to an embodiment, as the electronic device 300 is opened, the first distance d1 and/or the size of the resonance space 330 may increase. According to an embodiment, the size of the resonance space 330 in the fully opened state (e.g., FIG. 8) of the electronic device 300 may be larger than the size of a resonance space (not shown) in a partially opened state (not shown) of the electronic device 300. According to an embodiment, in the fully closed state (e.g., FIG. 7) of the electronic device 300, the resonance space 330 may be substantially non-existent.

According to an embodiment, the speaker module 250 may be disposed in the housings 310 and 320. According to an embodiment (e.g., FIG. 7), the speaker module 250 may be disposed in the first housing 310, but the position where the speaker module 250 is disposed is not limited to the first housing 310. For example, according to another embodiment (e.g., FIG. 4), the speaker module 250 may be disposed in the second housing 320.

According to an embodiment, at least a portion of the sound generated by the speaker module 250 may be transferred to the resonance space 330. For example, the speaker module 250 may radiate a first sound S1 (e.g., vibration) in a first direction (e.g., −Y direction) facing the outside of the electronic device 300 and may radiate a second sound S2 (e.g., vibration) in a second direction (+Y direction) different from the first direction (−Y direction). According to an embodiment, the first sound S1 may be transferred to the outside of the electronic device 300 through a radiation hole (e.g., the radiation hole 251 of FIG. 5) formed in the first enclosure surface 259*a* (e.g., the first enclosure surface 259*a* of FIG. 5) of the speaker module 250, and the second sound S2 may be transferred to the resonance space 330 through a first resonance hole 253*a* (e.g., the first resonance hole 253*a* of FIG. 5) formed in the second enclosure surface 259*b* (e.g., the second enclosure surface 259*b* of FIG. 5) opposite to the first speaker surface 259*a*. According to an embodiment, the second sound S2 transferred in the second direction (+Y direction) may resonate in the resonance space 330. At least a portion of the second sound S2 may be radiated in the first direction (−Y) after resonating in the resonance space 330. Because at least a portion (e.g., the second sound S2) of the sound generated by the speaker module 250 resonates in the resonance space 330, the performance of the speaker module 250 in the low-pitched band may be enhanced. For example, in the open state (e.g., FIG. 8), the electronic device 300 may include the resonance space 330. The output (e.g., the magnitude of sound) of the speaker module 250 of the electronic device 300 in the open state may be larger than the output of the speaker module 250 of the electronic device 300 in the closed state (e.g., FIG. 7).

Figure 9:
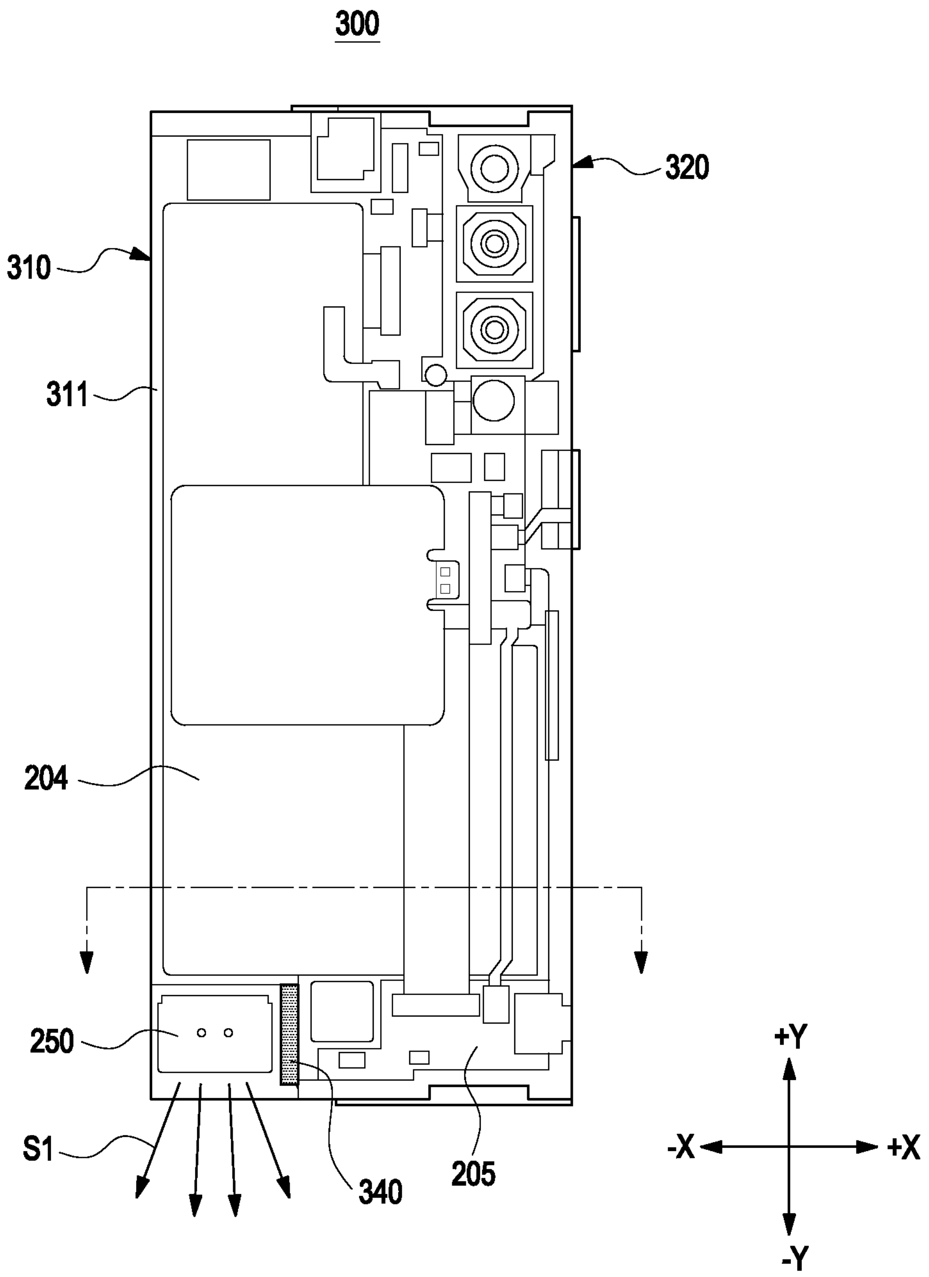
FIG. 9 is a view illustrating an internal structure of an electronic device including a first sealing member in a closed state according to an embodiment of the disclosure.
Figure 10:
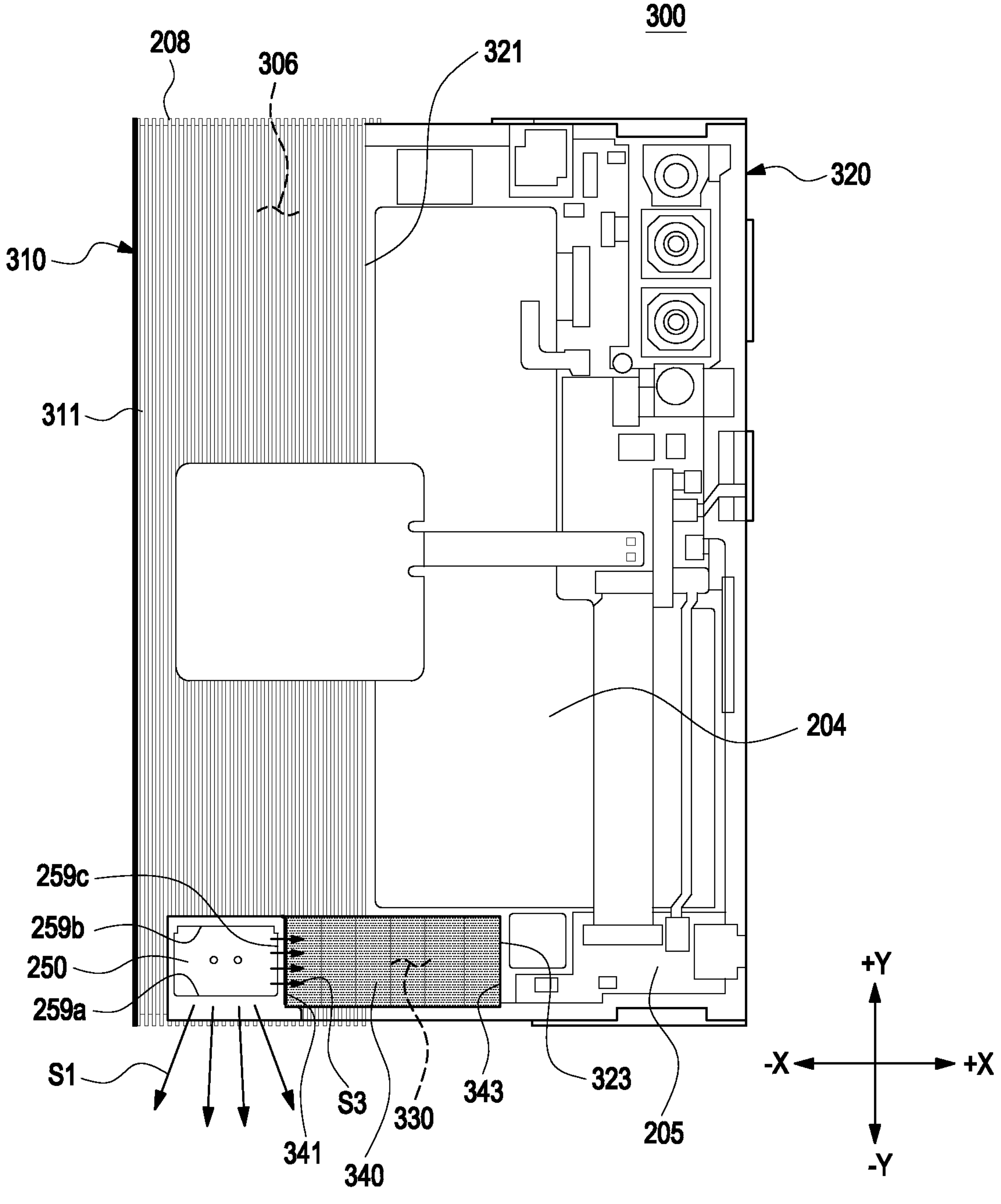
FIG. 10 is a view illustrating an internal structure of an electronic device including a first sealing member in an open state according to an embodiment of the disclosure.

FIG. 9 is a view illustrating an internal structure of an electronic device including a first sealing member in a closed state according to an embodiment of the disclosure. FIG. 10 is a view illustrating an internal structure of an electronic device including a first sealing member in an open state according to an embodiment of the disclosure.

Referring to FIGS. 9 and 10, an electronic device 300 may include a first housing 310, a second housing 320, a speaker module 250, and a first sealing member 340. The configuration of the electronic device 300, the first housing 310, the second housing 320, the resonance space 330, the battery 204, the printed circuit board 205, the multi-bar structure 208, and the speaker module 250 of FIGS. 9 and/or 10 may be identical in whole or part to the configuration of the electronic device 300, the first housing 310, the second housing 320, the resonance space 330, the battery 204, the printed circuit board 205, the multi-bar structure 208, and the speaker module 250 of FIGS. 7 and/or 8.

According to an embodiment, the electronic device 300 may include a first sealing member 340 for forming at least a portion of the resonance space 330. According to an embodiment, the first sealing member 340 may prevent or reduce the outflow of air from the resonance space 330. For example, the first sealing member 340 may surround at least a portion of the resonance space 330. According to an embodiment, a first end 341 of the first sealing member 340 may be connected with the first housing 310, and a second end 343, which is opposite to the first end 341, may be connected with the second housing 320. For example, in the electronic device 300 (e.g., FIG. 10) including the speaker module 250 disposed in the first housing 310, the first end 341 of the first sealing member 340 may be connected with the third enclosure surface 259*c* of the speaker module 250, and the second end 343 of the second sealing member 350 may be connected with the third sidewall structure 323 of the second housing 320. According to an embodiment, an end (e.g., the first end 341) of the first sealing member 340 may include an open structure, and another end (e.g., the second end 343) of the first sealing member 340 may include a closed structure. The inner space of the first sealing member 340 may be the resonance space 330. According to an embodiment, the first sealing member 340 may have an open structure at two opposite ends (e.g., the first end 341 and the second end 343), and the space surrounded by the first sealing member 340 and the third sidewall structure 323 may be interpreted as the resonance space 330.

According to an embodiment, the shape of the first sealing member 340 may be changed based on the slide of the first housing 310. For example, the first sealing member 340 may be a foldable structure. According to an embodiment, the first sealing member 340 may have a corrugated extension structure and may be unfolded or folded based on the slide of the first housing 310. According to an embodiment, the first sealing member 340 may be made of a flexible material. According to an embodiment, at least a portion of the first sealing member 340 may be formed in a closed loop shape.

According to an embodiment, at least a portion of the sound generated by the speaker module 250 may be transferred to the resonance space 330 surrounded by the first sealing member 340. For example, the speaker module 250 may radiate a first sound S1 (e.g., vibration) in a first direction (e.g., −Y direction) facing the outside of the electronic device 300 and may radiate a third sound S3 (e.g., vibration) in a third direction (+X direction) different from the first direction (−Y direction) and toward the first sealing member 340. According to an embodiment, the first sound S1 may be transferred to the outside of the electronic device 300 through a radiation hole (e.g., the radiation hole 251 of FIG. 5) formed in the first speaker surface 259*a* (e.g., the first enclosure surface 259*a* of FIG. 5) of the speaker module 250, and the third sound S3 may be transferred to the resonance space 330 through a second resonance hole (e.g., the second resonance hole 253*b* of FIG. 5) formed in the third enclosure surface 259*c* (e.g., the third enclosure surface 259*c* of FIG. 5). According to an embodiment, the third enclosure surface 259*c* may be positioned between the first speaker surface 259*a* and the second enclosure surface 259*b* opposite to the first speaker surface 259*a*. According to an embodiment, at least a portion of the third sound S3 transferred in the third direction (+X direction) may resonate in the resonance space 330. At least a portion of the third sound S3 may be radiated in the first direction (−Y) after resonating in the resonance space 330. Because at least a portion (e.g., the third sound S3) of the sound generated by the speaker module 250 resonates in the resonance space 330, the performance of the speaker module 250 in the low-pitched band may be enhanced.

Figure 11A:
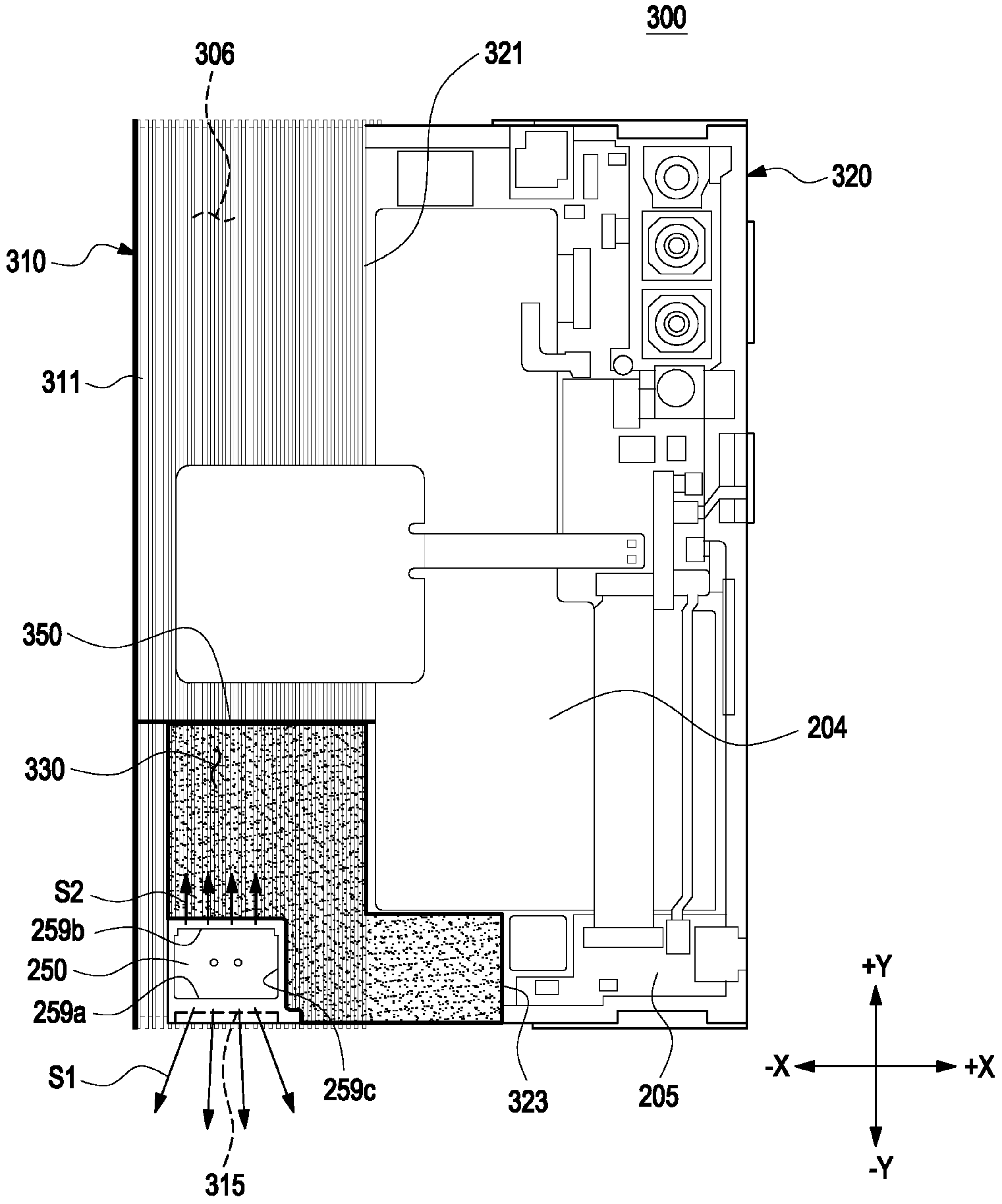
FIGS. 11A, 11B, and 11C are views illustrating an internal structure of an electronic device including a second sealing member in an open state, according to certain embodiments of the disclosure.
Figure 11B:
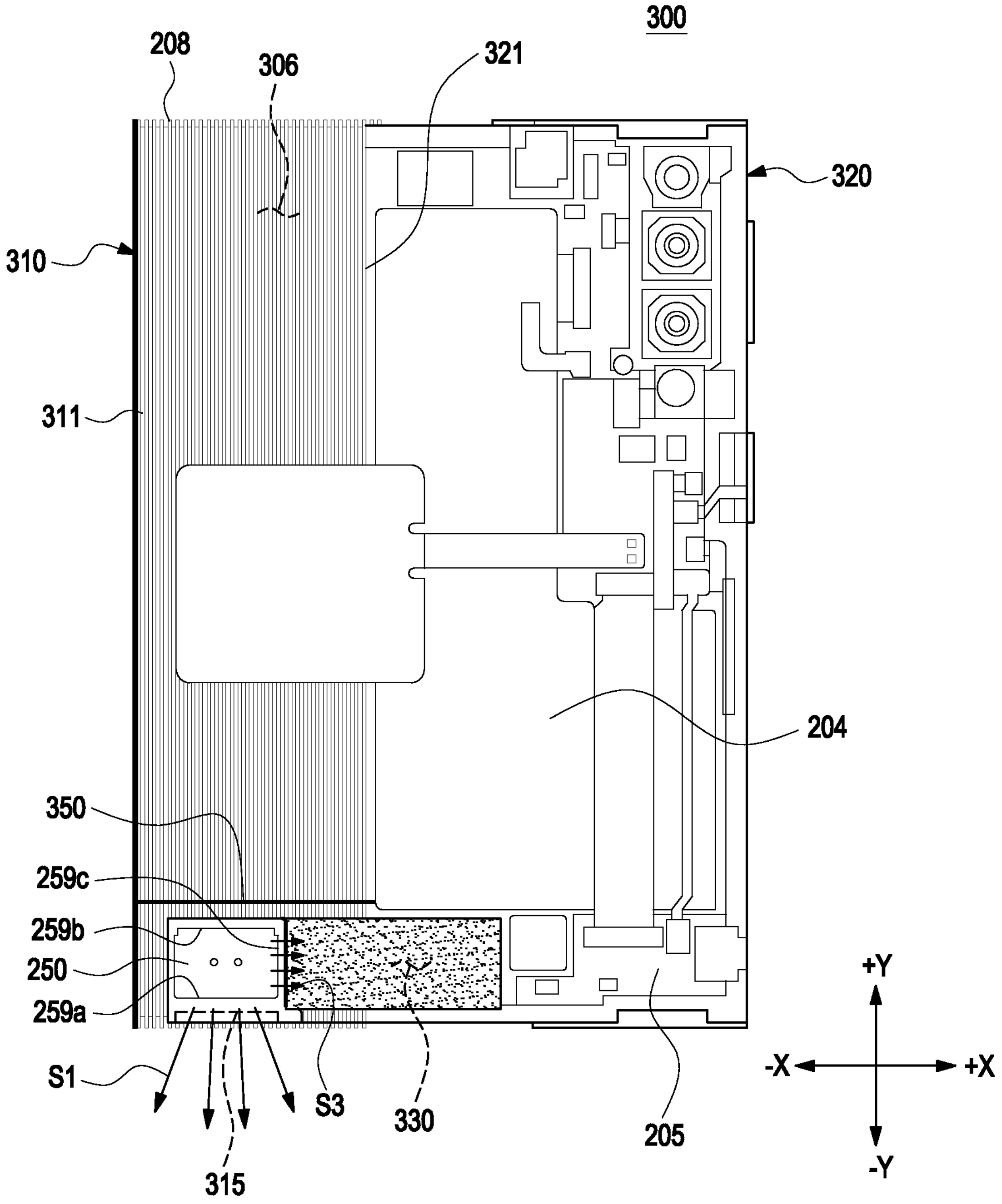
Figure 11C:
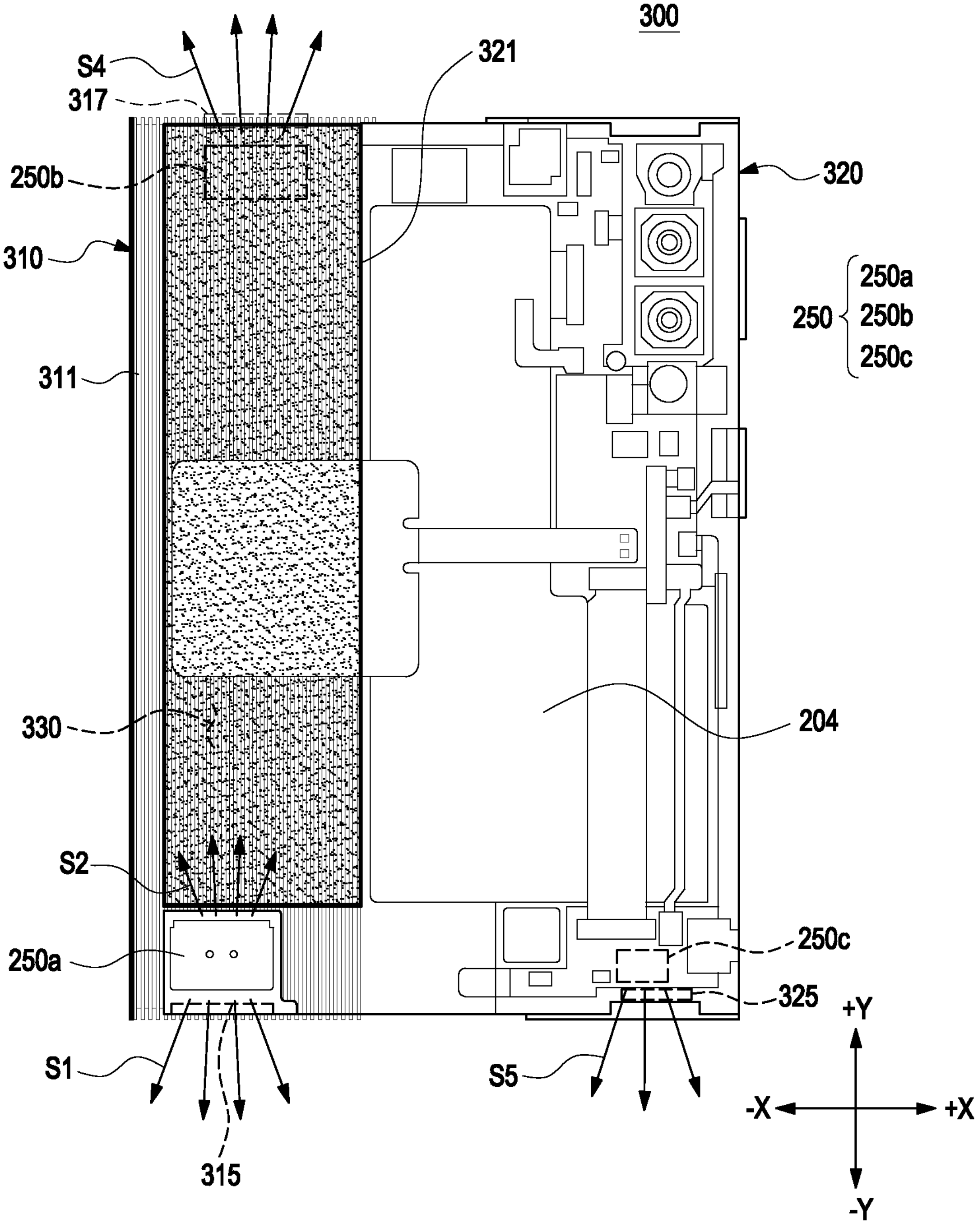

FIGS. 11A, 11B, and 11C are views illustrating an internal structure of an electronic device including a second sealing member in an open state, according to certain embodiments of the disclosure.

Referring to FIGS. 11A, 11B, and 11C, an electronic device 300 may include a first housing 310, a second housing 320, a speaker module 250, and a second sealing member 350. The configuration of the electronic device 300, the first housing 310, the second housing 320, the resonance space 330, the battery 204, the printed circuit board 205, the multi-bar structure 208, and the speaker module 250 of FIGS. 11A, 11B, and/or 11C may be identical in whole or part to the configuration of the electronic device 300, the first housing 310, the second housing 320, the resonance space 330, the battery 204, the printed circuit board 205, the multi-bar structure 208, and the speaker module 250 of FIGS. 7 and/or 8.

According to an embodiment, the electronic device 300 may include a second sealing member 350 for forming at least a portion of the resonance space 330. According to an embodiment, the second sealing member 350 may prevent or reduce the outflow of air from the resonance space 330. For example, the second sealing member 350 may surround at least a portion of the resonance space 330. According to an embodiment (e.g., FIGS. 11A and 11B), the second sealing member 350 may be connected with the first sidewall structure 311 of the first housing 310 and the second sidewall structure 321 of the second housing 320. According to an embodiment, the resonance space 330 may refer to a space, within the inner space 306 of the electronic device 300, in which the inflow or outflow of air to/from the outside of the electronic device 300 is prevented or reduced using the second sealing member 350.

According to an embodiment, the shape of the second sealing member 350 may be changed based on the slide of the first housing 310. According to an embodiment, the second sealing member 350 may be made of a flexible material.

According to an embodiment, at least a portion of the sound generated by the speaker module 250 may be transferred to the resonance space 330 surrounded by the second sealing member 350. According to an embodiment (e.g., FIGS. 11A and 11C), the speaker module 250 may radiate a first sound S1 (e.g., vibration) in a first direction (e.g., −Y direction) facing the outside of the electronic device 300 and may radiate a second sound S2 (e.g., vibration) in a second direction (+Y direction) opposite to the first direction (−Y direction). According to an embodiment (e.g., FIG. 11B), the speaker module 250 may radiate a first sound S1 in a first direction (e.g., −Y direction) facing the outside of the electronic device 300 and may radiate a third sound S3 (e.g., vibration) in a third direction (+X direction) different from the first direction (−Y direction) and toward the second housing 320. According to an embodiment (not shown), the speaker module 250 may radiate a first sound S1 in a first direction (e.g., −Y direction) facing the outside of the electronic device 300 and may radiate sounds in a second direction (+Y direction) and a third direction (+X direction).

According to an embodiment (e.g., FIG. 11C), at least a portion of the sound generated by the speaker module 250 may be transferred to the outside of the electronic device 300 through the resonance space 330. According to an embodiment, the electronic device 300 may include a first speaker hole 315 and a second speaker hole 317 positioned opposite to the first speaker hole 315. The first sound S1 may be transferred to the outside of the electronic device 300 through the first speaker hole 315, and at least a portion of the second sound S2 may be transferred to the outside of the electronic device 300 through the resonance space 330 and the second speaker hole 317. The sound radiated to the outside of the electronic device 300 through the resonance space 330 and the second speaker hole 317 may be referred to as a fourth sound S4. The fourth sound S4 may be radiated in a direction substantially opposite to the direction in which the first sound S1 has been radiated.

According to an embodiment, the speaker module 250 may include at least one speaker module (e.g., the first speaker module 250*a*, the second speaker module 250*b*, and/or the third speaker module 250*c*).

According to an embodiment, the electronic device 300 may include the first speaker module 250*a* facing the first speaker hole 315 and the second speaker module 250*b* facing the second speaker hole 317. According to an embodiment, the direction of the sound radiated from the first speaker module 250*a* and the direction of the sound radiated from the second speaker module 250*b* may be opposite to each other. For example, the first speaker module 250*a* may output a sound (e.g., the first sound S1) in a first direction (−Y direction), and the second speaker module 250*b* may output a sound (e.g., the fourth sound S4) in a second direction (+Y direction) opposite to the first direction (−Y direction). According to an embodiment, at least a portion of the sound output from the first speaker module 250*a* and/or at least a portion of the sound output from the second speaker module 250*b* may resonate in the resonance space 330.

According to an embodiment, the electronic device 300 may include the first speaker module 250*a* disposed in the first housing 310 and the third speaker module 250*c* disposed in the second housing 320. The distance between the first speaker module 250*a* and the third speaker module 250*c* may be changed based on the slide of the first housing 310 with respect to the second housing 320. According to an embodiment, at least a portion (e.g., the first sound S1) of the sound output from the first speaker module 250*a* and at least a portion (e.g., the fifth sound S5) of the sound output from the third speaker module 250*c* may be radiated in substantially parallel directions. For example, the electronic device 300 may include the first speaker hole 315 and a third speaker hole 325 facing in substantially the same direction as the first speaker hole 315. The first sound S1 output from the first speaker module 250*a* may be transferred to the outside of the electronic device 300 through the first speaker hole 315, and the fifth sound S5 output from the third speaker module 250*c* may be transferred to the outside of the electronic device 300 through the third speaker hole 325.

According to an embodiment, the processor (e.g., the processor 120 of FIG. 1) may adjust the output of the speaker module 250 based on whether the electronic device 300 is open or closed. For example, in a first state (e.g., FIG. 7) in which the electronic device 300 is closed, the processor 120 may output sound using one of the first speaker module 250*a* or the third speaker module 250*c* and, in a second state (e.g., FIG. 11C) in which the electronic device 300 is opened, the processor 120 may output a sound using the first speaker module 250*a* and the third speaker module 250*c*.

Figure 12:
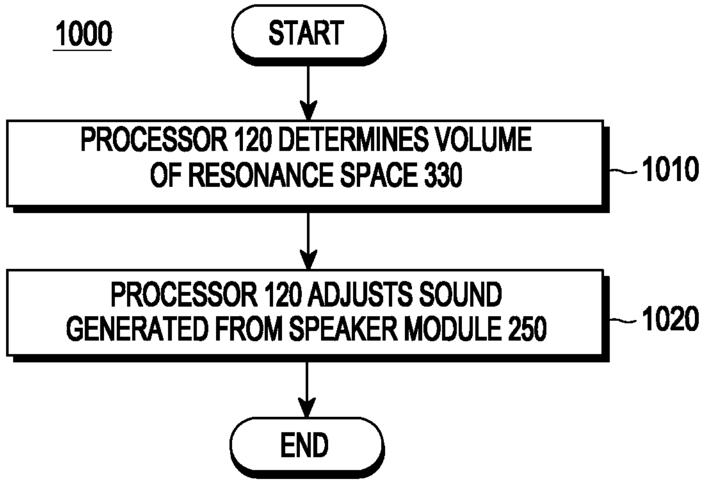
FIG. 12 is a flowchart illustrating operations of a speaker module according to an embodiment of the disclosure.

FIG. 12 is a flowchart illustrating operations of a speaker module according to an embodiment of the disclosure.

Referring to FIG. 12, operations 1000 of the speaker module 250 of the electronic device (e.g., the electronic device 200 of FIG. 2) may include an operation 1010 in which the processor 120 determines the volume of the resonance space 330 and an operation 1020 in which the processor 120 adjusts the sound generated from the speaker module 250. The configuration of the processor 120 of FIG. 12 may be identical in whole or part to the configuration of the processor 120 of FIG. 1. The configuration of the speaker module 250 and the resonance space 330 of FIG. 12 may be identical in whole or part to the configuration of the speaker module 250 and the resonance space 330 of FIG. 8. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the processor (e.g., the processor 120 of FIG. 1) of the electronic device 200 may perform the operation 1010 of determining the volume of the resonance space 330.

According to an embodiment, the memory (e.g., the memory 130 of FIG. 1) may store volume data of the resonance space 330 corresponding to a first distance d1 between the first housing (e.g., the first housing 310 of FIG. 8) and the second housing (e.g., the second housing 320 of FIG. 8). The processor 120 may adjust the output of the speaker module 250 based on the volume data of the resonance space 330. For example, the volume data may be stored in a database including information regarding the volume and/or size of the resonance space 330 corresponding to the first distance d1.

According to an embodiment, the processor 120 may determine the state of the electronic device 200 or the degree to which the electronic device 200 is opened using a sensor module (e.g., the sensor module 176 of FIG. 1) and may determine the volume of the resonance space 330 based on the degree to which the electronic device 200 is opened. For example, the sensor module 176 (e.g. a hall sensor) may detect the first distance d1 between the first housing (e.g., the first housing 310 of FIG. 8) and the second housing (e.g., the second housing 320 of FIG. 8), and the processor 120 may determine the size and/or volume of the resonance space 330 based on the first distance d1 detected by the sensor module 176.

According to an embodiment, the processor 120 may determine whether the electronic device 200 is in a fully closed state (e.g., FIG. 2), a fully open state (e.g., FIG. 3), or an intermediate state (e.g., a state between the closed state and the open state) and may determine the volume of the resonance space 330 based on the determined state of the electronic device 200 or the degree to which the electronic device 200 is opened. For example, the memory (e.g., the memory 130 of FIG. 1) may store the volume of the resonance space 330 in the fully closed state (e.g., FIG. 1) of the electronic device 200 and the volume of the resonance space 330 in the fully open state (e.g., FIG. 3) of the electronic device 200. According to an embodiment, the processor 120 may linearly and/or non-linearly determine at least a portion of the volume of the resonance space 330 in the intermediate state, based on the volume of the resonance space 330 in the fully closed state, the volume of the resonance space 330 in the fully open state, and the first distance d1. For example, the processor 120 may determine the volume of the resonance space 330 based on a designated shape of the electronic device 200 and/or the first distance d1.

According to an embodiment, the processor 120 may perform the operation 1120 of adjusting the sound generated by the speaker module 250. For example, the processor 120 may adjust the output of the speaker module 250 based on the changed volume and/or size of the resonance space 330. According to an embodiment, the processor 120 may adjust the output of the speaker module 250 so that the output of the speaker module 250 of the electronic device 200 in the open state is larger than the output of the speaker module 250 of the electronic device 200 in the closed state.

According to an embodiment, the processor 120 may control the operation of the speaker module 250 based on a user input. For example, when the electronic device 200 is opened, the processor 120 may output a message for adjusting the output of the speaker module 250 (e.g., turning up the sound volume). When the user agrees to the adjustment of the output of the speaker module 250, the processor 120 may adjust the signal applied to the speaker module 250 to correspond to the changed size of the resonance space 330. According to an embodiment, when the electronic device 200 is opened, the processor 120 may adjust the signal applied to the speaker module 250 so that the output from the speaker module 250 automatically corresponds to the size of the resonance space 330. According to an embodiment, when a designated program is used, the processor 120 may adjust the signal applied to the speaker module 250 so that the output from the speaker module 250 corresponds to the size of the resonance space 330.

According to an embodiment of the disclosure, an electronic device (e.g., the electronic device 200 of FIG. 2) may comprise a housing (e.g., the housing 202 of FIG. 2) including a first housing (e.g., the first housing 210 of FIG. 2) and a second housing (e.g., the second housing 220 of FIG. 2) receiving at least a portion of the first housing and configured to guide a slide of the first housing, a display (e.g., the display 230 of FIG. 3) including a first display area (e.g., the first display area 231 of FIG. 3) disposed on the second housing and a second display area (e.g., the second display area 232 of FIG. 3) extending from the first display area, a speaker module (e.g., the speaker module 250 of FIG. 7) disposed in the housing, and a resonance space (e.g., the resonance space 330 of FIG. 8) facing at least a portion of the speaker module and configured to vary in size based on the slide of the first housing with respect to the second housing, and a processor (e.g., the processor 120 of FIG. 8)

configured to adjust a sound output from the speaker module based on the size of the resonance space.

According to an embodiment, the electronic device may further comprise a sealing member (e.g., the first sealing member 340 of FIG. 10 and/or the second sealing member 350 of FIG. 11) disposed in the housing, forming at least a portion of the resonance space, and configured to be deformed based on the slide of the first housing.

According to an embodiment, the sealing member may include a first sealing member (e.g., the first sealing member 340 of FIG. 10) configured to be unfolded or folded based on the slide of the first housing.

According to an embodiment, at least a portion of the first sealing member may be formed in a closed loop shape.

According to an embodiment, the first housing may include a first sidewall structure, and the second housing may include a second sidewall structure substantially parallel to the first sidewall structure. The sealing member may include a second sealing member (e.g., the second sealing member 350 of FIG. 11A) connected to the first sidewall structure and the second sidewall structure.

According to an embodiment, the speaker module may include a radiation hole (e.g., the radiation hole 251 of FIG. 5) for transferring vibration generated from the speaker module to an outside of the electronic device and a resonance hole (e.g., the first resonance hole 253*a* and/or the second resonance hole 253*b* of FIG. 5) facing the resonance space.

According to an embodiment, the housing may include a first speaker hole (e.g., the first speaker hole 315 of FIG. 11C) and a second speaker hole (e.g., the second speaker hole 317 of FIG. 11C) positioned opposite to the first speaker hole. At least a portion of sound generated from the speaker module may be configured to be transferred to an outside of the electronic device through the first speaker hole, the second speaker hole, and the resonance space.

According to an embodiment, the speaker module may include a first speaker module (e.g., the first speaker module 250*a* of FIG. 11C) facing the first speaker hole and a second speaker module (e.g., the second speaker module 250*b* of FIG. 11C) facing the second speaker hole.

According to an embodiment, the electronic device may further comprise a memory (e.g., the memory 130 of FIG. 1) configured to store volume data of the resonance space corresponding to a first distance (e.g., the first distance d1 of FIG. 8) between the first housing and the second housing. The processor may be configured to adjust an output of the speaker module based on the volume data of the resonance space.

According to an embodiment, the electronic device may further comprise at least one sensor module (e.g., the sensor module 176 of FIG. 1) configured to detect a first distance (e.g., the first distance d1 of FIG. 8) between the first housing and the second housing. The processor may be configured to determine the size of the resonance space based on the first distance.

According to an embodiment, the speaker module may include a first speaker module (e.g., the first speaker module 250*a* of FIG. 11C) disposed in the first housing and a third speaker module (e.g., the third speaker module 250*c* of FIG. 11C) disposed in the second housing. The processor may be configured to output sound using one of the first speaker module or the third speaker module in a first state in which the electronic device is closed and to output the sound using the first speaker module and the third speaker module in a second state in which the electronic device is opened.

According to an embodiment, the speaker module may include a speaker enclosure (e.g., the speaker enclosure 259 of FIG. 5) and an internal resonance space (e.g., the internal resonance space 255 of FIG. 5) at least partially surrounded by the speaker enclosure.

According to an embodiment, the electronic device may further comprise a multi-bar structure (e.g., the multi-bar structure 208 of FIG. 5) configured to guide movement of the display.

According to an embodiment, the electronic device may further comprise a roller (e.g., the roller 240 of FIG. 4) rotatably mounted on the first housing and configured to guide rotation of the display.

According to an embodiment of the disclosure, an electronic device (e.g., the electronic device 200 of FIG. 2) may comprise a housing (e.g., the housing 202 of FIG. 2) including a first housing (e.g., the first housing 210 of FIG. 2) and a second housing (e.g., the second housing 220 of FIG. 2) receiving at least a portion of the first housing and configured to guide a slide of the first housing, a display (e.g., the display 230 of FIG. 3) including a first display area (e.g., the first display area 231 of FIG. 3) visually exposed to an outside of the housing and a second display area (e.g., the second display area 232 of FIG. 3) extending from the first display area and configured to be received in the second housing based on a slide of the first housing with respect to the second housing, a speaker module (e.g., the speaker module 250 of FIG. 4) disposed in the housing, a resonance space (e.g., the resonance space 330 of FIG. 8) facing at least a portion of the speaker module and configured to vary in size based on the slide of the first housing with respect to the second housing, and a sealing member (e.g., the first sealing member 340 of FIG. 10 and/or the second sealing member 350 of FIG. 11) disposed in the housing, forming at least a portion of the resonance space, and configured to be deformed based on the slide of the first housing.

According to an embodiment, the sealing member may include a first sealing member (e.g., the first sealing member 340 of FIG. 10) configured to be unfolded or folded based on the slide of the first housing and at least partially formed in a closed loop shape.

According to an embodiment, the first housing may include a first sidewall structure (e.g., the first sidewall structure 311 of FIG. 8), and the second housing may include a second sidewall structure (e.g., the second sidewall structure 321 of FIG. 8) substantially parallel to the first sidewall structure. The sealing member may include a second sealing member (e.g., the second sealing member 350 of FIG. 11A) connected to the first sidewall structure and the second sidewall structure.

According to an embodiment, the speaker module may include a radiation hole (e.g., the radiation hole 251 of FIG. 5) for transferring vibration generated from the speaker module to an outside of the electronic device and a resonance hole (e.g., the first resonance hole 253*a* and/or the second resonance hole 253*b* of FIG. 5) facing the resonance space.

According to an embodiment, the electronic device may further comprise a processor (e.g., the processor 120 of FIG. 1) configured to adjust the sound output from the speaker module based on the size of the resonance space.

It is apparent to one of ordinary skill in the art that an electronic device including a speaker module as described above are not limited to the above-described embodiments and those shown in the drawings, and various changes, modifications, or alterations may be made thereto without departing from the scope of the present disclosure.

The invention claimed is:

1. An electronic device comprising:

a housing including a first housing and a second housing coupled with each other such that the first housing is to slide into or out of the second housing, and that a size of a resonance space formed in the first housing or the second housing is to vary based at least in part on the sliding of the first housing into or out of the second housing;

a flexible display including a first display area configured to remain as visually exposed to an outside of the electronic device, and a second display area extended from the first display area and configured to be hidden from view or visually exposed to the outside based at least in part on the sliding of the first housing into or out of the second housing; and a speaker module including a enclosure having one or more holes through which a sound generated in the speaker module is to be radiated out of the speaker module, the speaker module accommodated in the first housing or the second housing such that at least one hole of the one or more holes faces the resonance space configured to vary in size based at least in part on the sliding of the first housing into or out of the second housing.

2. The electronic device of claim 1, further comprising:

a sealing member disposed in the first housing or the second housing to form at least part of the space, and configured to be deformed based at least in part on the sliding of the first housing into or out of the second housing.

3. The electronic device of claim 2, wherein the sealing member includes a first sealing member configured to be unfolded or folded based at least in part on the sliding of the first housing into or out of the second housing.

4. The electronic device of claim 3, wherein at least one portion of the first sealing member is formed in a closed loop shape.

5. The electronic device of claim 3, wherein the sealing member includes a second sealing member disposed in the first housing in a direction substantially perpendicular to that of the sliding of the first housing.

6. The electronic device of claim 5, wherein the second sealing member is configured to be unfolded or folded based at least in part on the sliding of the first housing into or out of the second housing.

7. The electronic device of claim 1, further comprising:

a processor configured to control the speaker module such that a characteristic of the sound generated from the speaker module is to be adjusted based at least in part on the size of the resonance space being varied.

* * * * *